(12) United States Patent
Wu et al.

(10) Patent No.: US 11,313,840 B2
(45) Date of Patent: Apr. 26, 2022

(54) METHOD FOR SEPARATING DIASTEREOMERS OF PRISTANE

(71) Applicant: Northwest Institute of Eco-Environment and Resources, CAS, Gansu (CN)

(72) Inventors: Yingqin Wu, Gansu (CN); Yanhong Liu, Gansu (CN); Tong Wang, Gansu (CN); Zuodong Wang, Gansu (CN); Longmiao Yuan, Gansu (CN); Zhiyu Wang, Gansu (CN)

(73) Assignee: Northwest Institute of Eco-Environment and Resources, CAS, Lanzhou (CN)

( * ) Notice: Subject to any disclaimer, the term of this patent is extended or adjusted under 35 U.S.C. 154(b) by 0 days.

(21) Appl. No.: 17/399,693

(22) Filed: Aug. 11, 2021

(65) Prior Publication Data

US 2021/0372973 A1 Dec. 2, 2021

(30) Foreign Application Priority Data

Jan. 11, 2021 (CN) .......................... 202110030435.0

(51) Int. Cl.

| | |
|---|---|
| *G01N 30/72* | (2006.01) |
| *B01J 20/22* | (2006.01) |
| *G01N 30/16* | (2006.01) |
| *B01J 20/281* | (2006.01) |
| *G01N 30/02* | (2006.01) |
| *G01N 30/00* | (2006.01) |

(52) U.S. Cl.
CPC .......... *G01N 30/7206* (2013.01); *B01J 20/22* (2013.01); *G01N 30/16* (2013.01); *G01N 30/482* (2013.01); *G01N 2030/025* (2013.01); *G01N 2030/167* (2013.01); *G01N 2030/484* (2013.01)

(58) Field of Classification Search
CPC .......... B01J 20/22; B01J 20/286; B01J 20/29; C07C 7/12; C07C 9/22; C07C 2200/07; G01N 30/7206; G01N 30/16; G01N 30/482; G01N 2030/025; G01N 2030/167; G01N 2030/484; G01N 30/88; G01N 2030/8854; G01N 2030/8877; G01N 30/02; G01N 30/8675
See application file for complete search history.

(56) References Cited

PUBLICATIONS

Dawson, Grice, and Alexander; Effect of maturation on the indigenous delta D signatures of individual hydrocarbons in sediments and crude oils from the Perth Basin (Western Australia), Sep. 18, 2004, Organic Geochemistry, vol. 36, pp. 95-104 (Year: 2004).*

(Continued)

*Primary Examiner* — Peter J Macchiarolo
*Assistant Examiner* — John M Royston

(57) ABSTRACT

A method for separating diastereomers of pristane. A pristane sample is prepared, and then injected into a chromatographic instrument equipped with a chiral chromatographic column, where a stationary phase of the chiral chromatographic column has a preset pore size. The pristane diastereomers in the pristane sample are separated by the chiral chromatographic column, and the components produced by the separation of the pristane diastereomers sequentially enter a mass spectrometer for detection and analysis.

1 Claim, 3 Drawing Sheets

Retention time

(56) References Cited

PUBLICATIONS

Dawson, Grice, Alexander, and Edwards; The effect of source and maturity on the stable isotopic compositions of individual hydrocarbons in sediments and crude oils from the Vulcan Sub-basin Timor sea, Northern Australia, Mar. 20, 2007, Organic Geochemistry, vol. 38, pp. 1015-1038 (Year: 2007).*
Frysinger and Gaines; Separation and identification of petroleum biomarkers by comprehensive two-dimensional gas chromatography, Dec. 21, 2000, Journal of Separation Science, vol. 24, pp. 87-96 (Year: 2000).*
Spaak, Nelson, Reddy, Scarlett, Chidlow, Grice; Advances on the separation of crocetane and phytane using GC-MS and GC×GC-TOFMS, May 31, 2016, Organic Geochemistry, vol. 98, pp. 176-182 (Year: 2016).*
Wu, Yingqin et al., "Separation of Diastereomers of acyclic Isoprenoid alkanes by GC-MS and Optimization of operation conditions." Petroleum Geology & Experiment.,vol. 34,No. 04, Jul. 31, 2012, pp. 422-426.
Cindy J. Barber et al., "Analysis of crocetane in crude oils and sediments: novel stationary phases for use in GC-MS." Organic Geochemistry ,vol. 32,No. 5, Dec. 30, 2001, pp. 765-769.
Patience et al., "The effect of maturation on the configuration of pristane in sediments and petroleum." Geochimica Et Cosmochimica Acta, vol. 42,No. 12, Aug. 18, 1978.pp. 1871-1875.
Patience et al., Acyclic isoprenoid alkanes and geochemical maturation. Physics & Chemistry of the Earth 1980. pp. 12:287-293.
Wu et al., The geochemical characteristics of coals from the Junggar Basin China and relation of the configuration of pristane with maturity in highly mature and over mature samples. Oil & Gas Science and Technology, 2016.vol. 71, No. 35.pp. 1-11.

\* cited by examiner

METHOD FOR SEPARATING DIASTEREOMERS OF PRISTANE

CROSS-REFERENCE TO RELATED APPLICATIONS

This application claims the benefit of priority from Chinese Patent Application No. 202110030435.0, filed on Jan. 11, 2021. The content of the aforementioned application, including any intervening amendments thereto, is incorporated herein by reference in its entirety.

TECHNICAL FIELD

This application relates to instrumental analysis, in particular to a method for separating diastereomers of pristane.

BACKGROUND

Due to the lack of vitrinite in the marine highly and overly mature source rocks of the Lower Paleozoic in China, it is difficult to evaluate the maturity of the highly and overly mature source rocks in the current oil and gas exploration process.

As an isoprenoid alkane, pristane is a conventional component in the soluble organic matter of source rocks. It has been previously found that the pristane isomerization ratio can be used as a new index to identify the maturity of soluble organic matter in highly and overly mature source rocks, providing a new way to study the thermal maturity of highly and overly mature source rocks (Patience et al., 1978. The effect of maturation on the configuration of pristane in sediments and petroleum. *Geochimica Et Cosmochimica Acta*, 42(12):1871-1875; Patience et al., 1980. Acyclic isoprenoid alkanes and geochemical maturation. *Physics & Chemistry of the Earth* 12:287-293; and Wu et al., 2016. The geochemical characteristics of coals from the Junggar Basin China and relation of the configuration of pristane with maturity in highly mature and over mature samples. *Oil & Gas Science and Technology*, 71(35): 1-11). Unfortunately, there is still a lack of effective and rapid separation and detection methods for the diastereomers of pristane. Conventionally, the separation is conducted with the help of an ordinary chromatographic column, but the separation effect is not satisfactory with the maximum resolution of only 64% (Wu et al., 2016. The geochemical characteristics of coals from the Junggar Basin China and relation of the configuration of pristane with maturity in highly mature and over mature samples. *Oil & Gas Science and Technology*, 71(35): 1-11). Moreover, the separation needs to be controlled by different temperature programs. At the same time, it takes at least 198 min to complete the separation and detection of a sample, leading to low efficiency. Due to the limitations of the separation technology, it fails to sufficiently separate the diastereomers of pristane, so that it cannot accurately calculate the pristine isomerization ratio, leading to inaccurate evaluation of the maturity of highly and overly mature source rocks.

SUMMARY

An object of this application is to provide a method for separating diastereomers of pristane to effectively improve the accuracy of evaluating the maturity of highly and overly mature source rocks.

Technical solutions of this application are described as follows.

This application provides a method for separating diastereomers of pristane, comprising: preparing a pristane sample;

injecting the pristane sample into a chromatographic instrument, wherein the chromatographic instrument is equipped with a chiral chromatographic column, and a stationary phase of the chiral chromatographic column has a preset pore size; and subjecting the diastereomers of pristane in the pristane sample to separation using the chiral chromatographic column; and subjecting components produced by separation of the diastereomers of pristane sequentially to detection and analysis using a mass spectrometer.

In some embodiments, the chiral chromatographic column is a β-cyclodextrin chiral chromatographic column.

In some embodiments, the β-cyclodextrin chiral chromatographic column is an Rt-βDEXcst chiral chromatographic column.

In some embodiments, the pristane sample is prepared through a step of:

dissolving a pristane standard in an organic solvent to prepare the pristane sample with a concentration of 0.01 mg/mL-0.1 mg/mL.

In some embodiments, the chromatographic instrument is an Agilent 7890 gas chromatograph.

In some embodiments, the separation of the diastereomers of pristane in the pristane sample by the chiral chromatographic column is performed under the following chromatographic conditions:

a carrier gas of the chromatographic instrument is helium with a constant flow rate of 0.8 mL/min; a temperature of an injection port of the chromatographic instrument is 280° C.; a split ratio of the injection port of the chromatographic instrument is (10-50):1; and a heating program of the chiral chromatographic column is set as follows: initial temperature 100° C. for 5 min; rising to 120° C. at a 1° C./min; and 120° C. for 20 min.

In some embodiments, the mass spectrometer is a 7000B triple quadrupole (QQQ) mass spectrometer.

In some embodiments, the detection and analysis of the components produced by separation of the diastereomers of pristine are performed under the following mass spectrometry (MS) conditions:

an ionization energy of the mass spectrometer is 70 eV; and an ion source temperature is 230° C.;

the components entering the mass spectrometer are collected by SCAN and MRM; and a scanning mass range of the SCAN and MRM is 80-300 amu.

In some embodiments, the chromatographic instrument is provided with a plurality of sample chambers; each of the plurality of sample chambers is configured to accommodate one pristane sample; and the plurality of sample chambers are respectively provided with the chiral chromatographic column to separate the components of the diastereomers of pristane in the pristane sample.

In some embodiments, the mass spectrometer is provided with a plurality of detection chambers; the plurality of detection chambers are in one-to-one correspondence to the plurality of sample chambers; and components produced from separation in each of the plurality of sample chambers sequentially enter a corresponding detection chamber to be detected and analyzed.

Compared with the prior art, this application has the following advantages.

Different from the prior art, this application uses a chiral chromatographic column to separate the pristane diastereomers in the pristane sample. Since the pristane contain chiral carbon atoms, the diastereomers of pristane have different optical activities. The chiral column is provided with a chiral stationary phase, which is prepared by fixing an optically active monomer on silica gel or other polymers. Different from ordinary chromatographic columns, the chiral chromatographic column creates a chiral environment to make the diastereomers of pristane vary in physical characteristics, and thus achieve chiral recognition, so as to achieve the separation of diastereomers of pristane. Moreover, the chiral chromatographic column provided herein has a preset pore size, which allows the components produced by the separation of the diastereomers of pristane to pass through, facilitating the separation of diastereomers of pristane.

BRIEF DESCRIPTION OF THE DRAWINGS

This disclosure will be further described in detail below with reference to the accompanying drawings.

DETAILED DESCRIPTION OF THE DISCLOSURE

Provided herein is a method for separating diastereomers of pristine, which is performed as follows (S100) A pristane sample is prepared.

(S200) The pristane sample is input into a chromatographic instrument equipped with a chiral chromatographic column, where a stationary phase of the chiral chromatographic column has a preset pore size. The pristane diastereomers in the pristane sample are separated by the chiral chromatographic column.

(S300) Components produced by the separation of the pristane diastereomersare sequentially enter a mass spectrometer for detection and analysis.

Figure 1:
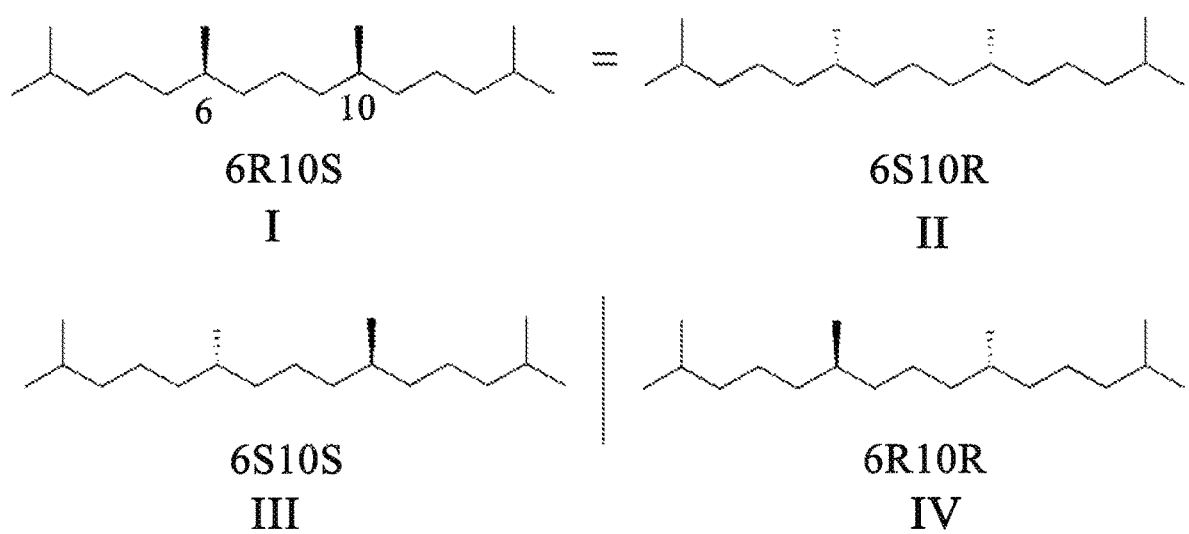
FIG. 1 shows molecular structures of pristane isomers.

The molecular structures of pristane isomers are shown in FIG. 1. In this embodiment, since the pristane contain chiral carbon atoms, the diastereomers of pristane have different optical activities. The chiral column is provided with a chiral stationary phase, which is prepared by fixing an optically active monomer made on silica gel or other polymers. Different from ordinary chromatographic columns, the chiral chromatographic column creates a chiral environment to make the diastereomers of pristane vary in physical characteristics pristine, and thus achieve chiral recognition, so as to achieve the separation of diastereomers of pristane. Moreover, the stationary phase of the chiral chromatographic column provided herein has a preset pore size, which allows the components produced by the separation of the diastereomers of pristane to pass through, facilitating the separation of diastereomers of pristane.

Specifically, in step (S100), the pristane sample is prepared as follows.

(S110) A preset amount of pristane standard is dissolved in an organic solvent to prepare the pristane sample with a concentration of 0.01 mg/mL-0.1 mg/mL.

In this embodiment, the pristane sample with a concentration of 0.01 mg/mL-0.1 mg/mL can directly enter the chromatographic instrument to be separated through a β-cyclodextrin chiral chromatographic column without being diluted.

In this embodiment, the organic solvent is n-hexane.

In an embodiment, the concentration of the prepared pristane sample is 0.05 mg/mL.

In an embodiment, the pristane standard is commercially-available pure pristane.

In an embodiment, the pore size of the stationary phase of the chiral chromatographic column is 0.5 nm-0.8 nm. In an embodiment, the chiral chromatographic column is a β-cyclodextrin chiral chromatographic column. Since the molecular weight of pristane is 268, compared with the existing α-cyclodextrin chiral chromatographic column (the pore size of the α-cyclodextrin chiral chromatographic column is so small that only small-molecule guest substances (such as monophenyl) can be included) and the γ-cyclodextrin chiral chromatographic column (the pore size of the γ-cyclodextrin chiral column is so large that they are only used for the entry of large-molecule terpenoids), the β-cyclodextrin chiral chromatographic column provided herein is more preferable due to its moderate size, which is within the preset range of 0.5-0.8 nm in this embodiment, enabling the pristane sample to pass through. Therefore, the β-cyclodextrin chiral chromatographic column is more suitable for the separation of diastereomers of pristane.

Further, the β-cyclodextrin chiral chromatographic column is an Rt-βDEXcst chiral chromatographic column, preferably a 30 m×0.32 mm×0.25 µm Rt-bDEXcst chiral chromatographic column (Agilent, USA).

Further, an injection volume of the pristane sample is 1 µL-2 µL, preferably 2 µL.

Further, the step (S200) is specifically performed as follows.

The pristane sample is vaporized, and then the pristane diastereomers in the vaporized pristane sample are separated through the chiral chromatographic column.

Further, the chromatographic instrument is an Agilent 7890 gas chromatograph. In some embodiments, the chromatographic instrument is an Agilent 6890 gas chromatograph.

Further, the mass spectrometer is a 7000B triple quadrupole mass spectrometer. The 7000B triple quadrupole mass spectrometer has a multi-reaction monitoring scanning function (MRM) and high sensitivity (up to 10 fg), which can improve the detection of each component produced from the separation of the pristane sample, effectively improving the detection accuracy of trace components. Specifically, the mass spectrometer can be other triple quadrupole mass spectrometers with the multiple reaction monitoring and scanning function (MRM).

In this embodiment, an Agilent 7890 gas chromatograph is coupled with a 7000B triple quadrupole mass spectrometer for GC-MS/MS analysis. The GC-MS/MS analysis has high sensitivity and strong anti-interference ability. The volume of a single injection is 2 µL. The column adopts a 30 m×0.32 mm×0.25 µm Rt-bDEXcst chiral column (Agilent, USA). The components of the pristane sample are identified according to the characteristic ions of the pristane sample, the relative retention time of each component in the chromatograph and mass spectrometer and searching results of the NIST 11 library.

Further, the chromatographic conditions for separation of the pristane diastereomers in the pristane sample by the chiral chromatographic column are described as follows:

the carrier gas is helium with a constant flow rate of 0.8 mL/min; a temperature of an injection port of the chromatograph is 280° C.; a split ratio of the injection port of the chromatograph is 10-50:1; and the heating program of the chiral chromatographic column is set as follows: initial temperature 100° C. for 5 min; increasing to 120° C. at 1° C./min; and 120° C. for 20 min.

In this embodiment, the carrier gas in the chromatograph is helium in a constant flow mode, so that the pristane sample can be carried by helium at a certain flow rate into the chiral chromatographic column for separation, and then various components produced from the separation are loaded into the mass spectrometer for detection and analysis. The helium gas only plays a role of carrying the pristane sample without participating in the separation, and moreover, the helium gas is chemically inert with the highest ionization energy among all gases, so that it is difficult to ionize, and will not affect the chromatogram baseline due to the unstable airflow. More importantly, the helium has a relative molecular mass of 4, and large flow conductance, so that it is easy to be separated from other molecular components, and has an enrichment effect on pristane samples.

In addition, the temperature of the injection port is set to 280° C. to allow the pristane sample input into the chromatograph to be quickly vaporized, and then enter the chiral chromatographic column according to the preset split ratio, realizing the separation of various components.

In some embodiments, the split ratio of the injection port of the chromatograph is set to 10-50:1, that is, only 1/50-1/10 of the vaporized pristane sample is allowed to enter the chiral chromatographic column for separation, which can effectively avoid the overload in the chiral chromatographic column.

In some embodiments, individual components produced by the separation of the pristane sample are detected and analyzed under the following mass spectrometry conditions: the ionization energy of the mass spectrometer is 70 eV; the ion source temperature is 230° C.; and the mass spectrometer collects the components entering the mass spectrometer by SCAN and MRM with a mass range of 80-300 amu.

In this embodiment, two acquisition methods, SCAN and MRM, are used to simultaneously analyze the components produced from the separation of the pristane sample. The SCAN is used to determine the components that are less affected by impurities and have sufficient sensitivity in the SCAN mode. In this case, the target components to be determined by MRM are minimized, which can minimize the pre-set work of analysis conditions of MRM.

In some embodiments, the chromatographic instrument is provided with a plurality of sample chambers, and each sample chamber is configured to accommodate one pristane sample. Moreover, each sample chamber is provided with a corresponding chiral chromatographic column to separate the components of pristane diastereomers in the pristane sample. Furthermore, the mass spectrometer is provided with a plurality of detection chambers, which are in one-to-one correspondence to the sample chambers; and individual components produced from separation in each sample chamber sequentially enter the corresponding detection chamber for detection and analysis. In this way, multiple samples can be separated, detected and analyzed at the same time, improving the efficiency.

Figure 3:
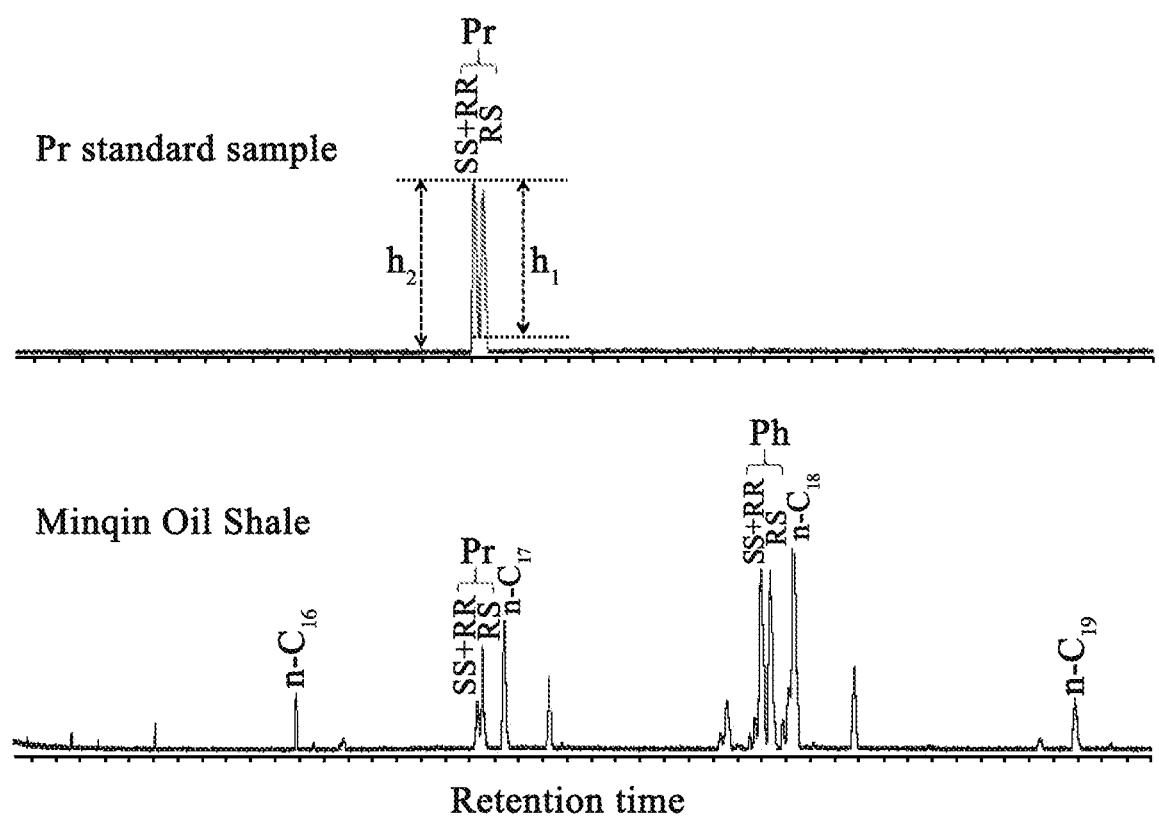
FIG. 3 illustrates separation of diastereomers of pristane by an Rt-bDEXcst (30 m×0.32 mm×0.25 µm) chiral chromatographic column, where the heating program of the chiral chromatographic column is set follows: initial temperature 100° C. for 5 min; increasing to 120° C. at 1.0° C./min; and 120° C. for 20 min; the upper picture is the standard sample, and the lower picture is the Minqin oil shale.

The diastereomers of pristane in an actual source rock (Minqin oil shale) are analyzed by the method provided herein under the following chromatographic conditions: the chiral chromatographic column is an Rt-bDEXcst (30 m×0.32 mm×0.25 μm) chiral chromatographic column; and the heating program of the chiral chromatographic column is set as follows: initial temperature 100° C. for 5 min; rising to 120° C. at 1.0° C./min; 120° C. for 20 min. The resolution of the diastereomers of pristane is calculated. The chromatogram is shown in FIG. 3, and the resolution is shown in Table 1. Table 1 also shows the separation parameters of the pristane diastereomers in the pristane sample.

TABLE 1

| Chromatography parameters for separation of pristane diastereomers | | | | | |
|---|---|---|---|---|---|
| Sample | Chromatographic column type | Initial temperature ° C. | Final temperature ° C. | Heating rate 0° C./min | Resolution % |
| Minqin Oil Shale | Rt-bDEXcst 30 m × 0.32 mm × 0.25 μm | 100 | 120 | 1 | 93 |

It can be seen from FIG. 3 that the method provided herein improves the degree of separation of isoprenoid diastereomers, and achieves almost complete separation of pristane diastereomers, with a resolution of 93%.

Through the combination of the Rt-bDEXcst chiral chromatographic column (30 m×0.32 mm×0.25 μm, Agilent, USA) with GC-MS(QQQ)/MS, the complete separation of the diastereomers of pristine is almost reached under certain conditions, which ensures the accuracy of calculating the ratio of diastereomers of biological and geological pristane, and solves the problem that the maturity of marine highly and overly mature source rocks cannot be determined due to the lack of vitrinite, providing technical support for deep and ultra-deep marine oil and gas exploration. At the same time, the method of this disclosure can also be fully applied to the identification of the maturity of the conventional vitrinite-containing source rock, and can avoid counting errors caused by manual operation in the process of counting the number of vitrinites under a microscope. Therefore, the pristane isomerization ratio can not only be used as a new indicator for determining the thermal maturity of marine highly and overly mature crude oil and source rocks, but also provide another way for determining the maturity of conventional continental source rocks.

At the same time, the disclosure improves the resolution of the diastereomers of pristane, and almost achieves the complete separation of the diastereomers of pristane, with a the resolution of 93% (as shown in FIG. 3 and Table 1). The method provided herein has the following advantages.

(1) It can be completely applied to the determination of the maturity of marine highly and overly mature source rocks and the research of oil-source correlation.

(2) This method has simple operation, in which the sample does not need to be specially treated.

Figure 2:
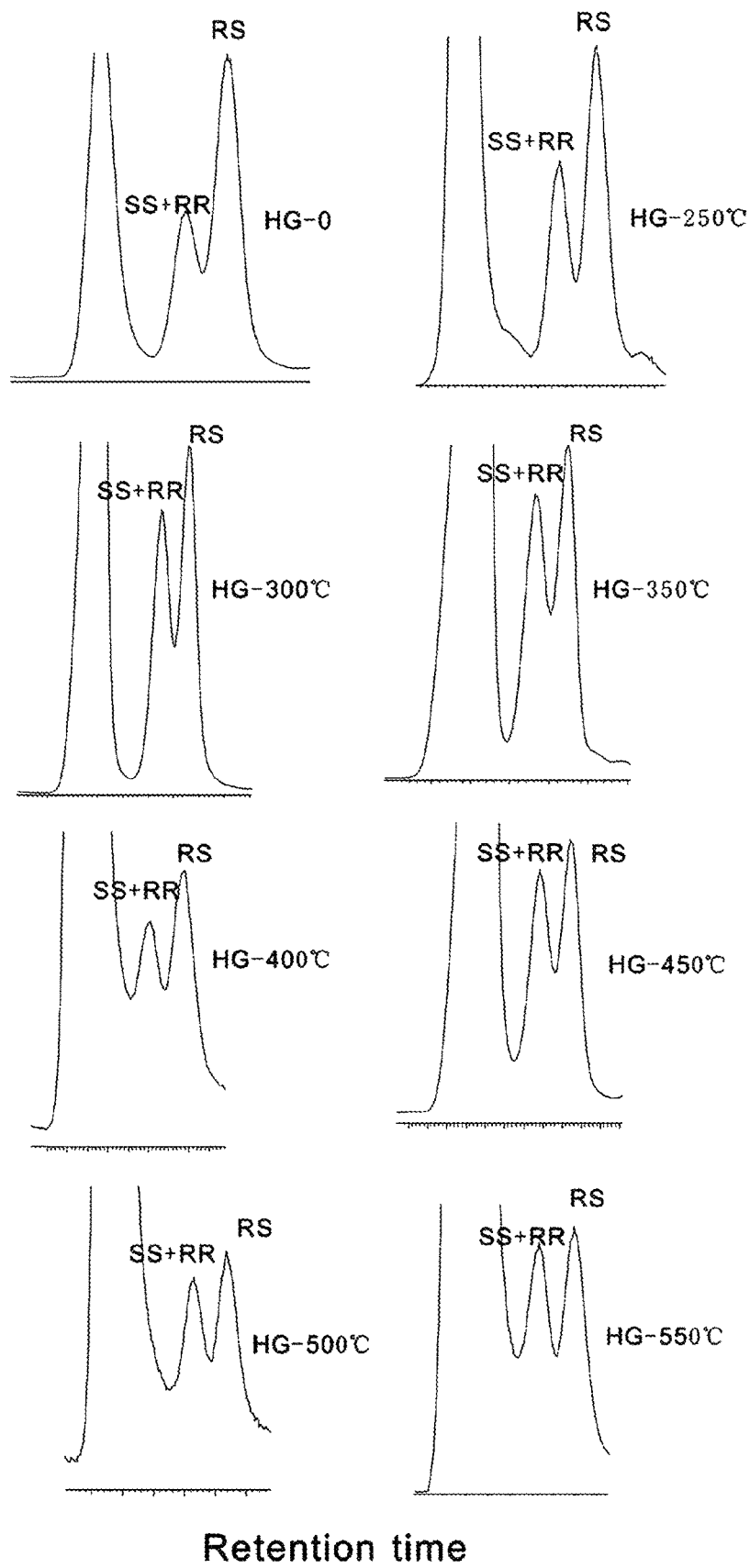
FIG. 2 depicts separation of diastereomers of pristane in Huangxian coal gangue (HG) by HP-5 (100 m×0.25 mm×0.25 µm) chromatographic column under thermal simulation at different temperatures, where the heating program of the chromatographic column is set as follows: initial temperature 80° C. for 1 min; increasing to 130° C. at 0.3° C./min; increasing to 280° C. at 5° C./min; and 280° C. for 30 min.

(3) This method facilitates improving the accuracy of determining the maturity of the source rock. Specifically, compared to the HP-5 chromatographic column (100 m×0.25 mm×0.25 μm) used in FIG. 2, the chiral chromatography column Rt-bDEXcst (30 m×0.32 mm×0.25 μm) used in FIG. 3 brings a higher resolution, so that the ratio of the diastereomers of pristane can be accurately calculated, and the maturity of the source rock can be more accurately identified, overcoming the difficulty in determining the maturity of marine highly and overly mature source rocks. Table 2 shows the resolution (R) of pristane diastereomers under different heating rates using different types of chromatographic columns.

TABLE 2 resolution (R) of pristane diastereomers under different heating rates using different types of chromatographic columns

| Chromatographic column type and resolution (R, %) | Heating rate 3° C./min | Heating rate 2° C./min | Heating rate 1° C./min | Heating rate 0.5° C./min | Heating rate 0.3° C./min |
|---|---|---|---|---|---|
| HP-5 (100 m) | — | — | — | 16 | 64 |
| Rt-bDEXcst (30 m) | 21 | 56 | 93 | — | — |

Note:
Resolution (R = 100% $h_1/h_2$); where $h_1$ is the distance from the top of the SS + RR peak in the diastereomers of pristine to the intersection of the RS peak and the SS + RR peak; $h_2$ is the peak height of the SS + RR peak in the diastereomers of pristine; and "—" means inseparable.

(4) The method improves the analysis speed and shortens the analysis time.

Specifically, compared with the conventional 100-m HP-5 chromatographic column, the 30-m Rt-bDEXcst chiral chromatographic column adopted herein greatly shortens the analysis time, saves the cost, and greatly improves the work efficiency. The heating rate of the 30-m Rt-bDEXcst chiral column is 1° C./min, and the required time is only 45 min; while the heating rate of the 100-m HP-5 column is 0.3° C./min, and the required time is as long as 198 min.

What is claimed is:

1. A method for separating diastereomers of pristane in isoprenoid hydrocarbons, comprising:

preparing a pristane standard sample with a concentration of 0.05 mg/mL; and injecting the pristane standard sample into an Agilent 7890 gas chromatograph equipped with a 7000B triple quadrupole mass spectrometer for GC/MS/MS analysis;

wherein an injection volume is 2 μL; a chromatographic column is a 30 m×0.32 mm×0.25 μm Rt-βDEXcst chiral chromatographic column; individual components in the pristane standard sample are identified according to a characteristic ion and relative retention time of a corresponding reference standard and search results in NIST 11 library; a blank sample is injected between two adjacent injections of samples;

chromatographic conditions are listed as follows:

a carrier gas of the Agilent 7890 gas chromatograph is helium with a constant flow rate of 0.8 mL/min; a temperature of an injection port is 280° C.; and a heating program of the Rt-βDEXcst chiral chromatographic column is set as follows: initial temperature 100° C. for 5 min; rising to 120° C. at 1° C./min; and 120° C. for 20 min; and mass spectrometry conditions are listed as follows:

an ionization energy is 70 eV; an ion source temperature is 230° C.; and collection mode: full scan (SCAN) and multiple reaction monitoring (MRM); and a scanning mass range: 80-300 amu.

* * * * *